३,२३३,००८
HYDROCARBON CONVERSION PROCESS
Clifton G. Frye, Valparaiso, Ind., assignor to Standard Oil Company, Chicago, Ill., a corporation of Indiana
No Drawing. Filed Jan. 17, 1962, Ser. No. 166,921
11 Claims. (Cl. 260—683.65)

This invention relates to the production of branched-chain paraffinic hydrocarbons. More particularly, it relates to a process for producing isoparaffins from normal olefinic feedstocks wherein the formation of side reaction products, i.e., those products having a greater or lesser molecular weight than the feed, is reduced.

Heretofore, processes have been developed for converting olefins, such as normal pentenes, etc., to isoparaffins, such as isopentane, etc. Of particular interest are such known processes wherein a composite catalyst having balanced hydrogenation and isomerization activities is contacted with an olefinic hydrocarbon in the presence of hydrogen to produce a product containing more branched-paraffins than the paraffin isomer equilibrium amount. Such a composite isomerization-hydrogenation catalyst is biased in favor of the olefin isomerization activity, i.e., the normal olefin isomerization is much faster than the hydrogenation reactions occuring in the process. Typically, the deisred bias in catalyst activity is achieved with a catalyst comprising an active metallic hydrogenation component, a solid acidic component and an activity-control-affording agent. The biased catalyst provides a rapid rate of isomerization relative to that of hydrogenation under the conditions of the process.

It has been found that when a normal olefin feed is reacted with hydrogen over an isomerization-hydrogenation catalyst biased in favor of isomerization, side reactions tend to occur. These side reactions lead to products having a number of carbon atoms which may be greater or less than that of the feed, and such side reaction products are generally undesirable. For example, when converting normal pentenes to isopentane, it may not be desirable to produce isobutane. Also, the formation of branched $C_6$'s and $C_7$'s may be objectional because they are for the most part monomethyl substituted and have relatively low octane ratings.

Surprisingly, it has now been found that the formation of side reaction products can be reduced significantly by carrying out the above isomerization-hydrogenation reaction in the presence of a minor amount of an aromatic hydrocarbon or a mixture of aromatic hydrocarbons.

Briefly, in accordance with the present invention, there is provided a process for the production of branched-chain paraffinic hydrocarbons from less-branched, unsaturated hydrocarbons by contacting a light olefinic hydrocarbon feed in a reaction zone with an active isomerization-hydrogenation composite catalyst in the presence of a hydrogen-affording gas under isomerization-hydrogenation conditions, wherein the contacting is carried out in the presence of a minor amount, based on olefin feed, of an aromatic hydrocarbon. Preferably, the aromatic hydrocarbon is a polycyclic aromatic, which is introduced into the reaction zone in an amount between about 0.5 to 40 volume percent, and, advantageously, about 3 to 10 volume percent, based on olefin.

In a preferred embodiment, the present invention comprises contacting a normal olefin feed with an active isomerization-hydrogenation composite catalyst in a reaction zone in the presence of a hydrogen-affording gas under elevated pressure and at a temperature in the range of about 400° F. to 750° F., said catalyst comprising a hydrogenation component, an activity-control-affording agent and a solid acidic support, the catalyst activities being biased in favor of olefin isomerization, and introducing from about 0.5 to 40 volume percent, based on olefin, of a condensed ring polycyclic aromatic hydrocarbon into said reaction zone during said contacting.

In the process of the invention, a light olefinic hydrocarbon stream, which may be a substantially pure olefin or a hydrocarbon mixture having substantial olefin content, preferably 50 percent or more olefin, is selected as feedstock. Refinery streams particularly suitable as feedstocks for the process are light olefinic naphthas boiling in the range from about 20° F. to about 350° F., and, especially, light thermal or catalytic cracked naphthas containing substantial quantities of normal olefin having a carbon number distribution in the range of about $C_4$ to $C_{10}$. Advantageously, a narrow cut of such naphthas containing substantial quantities of $C_4$ to $C_7$ normal olefin, and most preferably a $C_5$ to $C_6$ olefinic fraction is employed as a feed for the process. The olefinic feedstock may be derived from petroleum, shale oil, gilsonite or other such organic materials.

The aromatic hydrocarbon is present in the reaction zone during the contacting of the olefin, hydrogen and catalyst to effectively reduce side reactions tending to occur during the isomerization-hydrogenation of the olefin to the corresponding isoparaffin. The aromatic hydrocarbon may be introduced into the reaction zone commingled with the olefin feed or it may be injected therein as a separate stream to effectively contact the catalyst. It may be found most advantageous to employ different amounts of particular aromatics, depending upon molecular weight, to optimize the beneficial results of the invention. Advantageously, heavy aromatics, which may be of the substituted or nonsubstituted types, are employed. Preferably, a heavy aromatic, such as polycyclic aromatics, e.g., of the condensed ring type, having from about 2 to 5 aromatic rings per molecule is employed. The polycyclic aromatic may be fully unsaturated or partially unsaturated, depending upon its source. The polycyclic aromatic may be a pure compound, or preferably, a refinery stream containing the desired polycyclic aromatics in admixture with other hydrocarbons which are not objectionable in the process is employed. For example, both a catalytic cycle oil, i.e., a heavy aromatic fraction from the catalytic cracking of a gas oil or the like, which boils in the range of about 350° F. to 850° F. and contains substantial quantities of bicyclic and/or tricyclic aromatics, or a reformate bottoms fraction, i.e., a heavy aromatic fraction from the catalytic hydroforming of a naphtha, boiling in the range of about 500° to 760° F. and containing substantial quantities of tricyclic aromatics, are well suited for use in the process of the present invention. Desirably, the polycylic aromatic is employed in an amount less than the olefin feed since very small amounts of aromatic have been found to be effective in reducing the formation of side reaction products. Typically, the aromatic is employed in an amount about 0.5 and 40 volume percent, and, preferably between about 3 to 10 volume percent, based on olefin. Normally, the aromatic is relatively unaffected under the conditions of the process, other than for some hydrogenation and cracking which may occur. The resulting isoparaffinic product may be separated from the reactor effluent by fractionation or other known means, if desired.

Typically, the olefinic feed and the aromatic hydrocarbon are introduced into the reaction zone to contact the catalyst in the presence of at least sufficient hydrogen for olefin saturation. The operation may be liquid phase, vapor phase, or mixed liquid-vapor phase and the catalyst bed may be of the fixed-bed type, or it may be fluidized or moving. Advantageously, a hydrogen rich gas such as substantially pure hydrogen catalytic reformer make-gas or other gas streams affording hydrogen for olefin saturation is introduced into the reaction zone with the feed. The minimum amount of hydrogen required will be the stoichiometric amount required for olefin saturation, and the amount of hydrogen will vary according to the nature of the feedstock. Preferably, an excess of hydrogen is employed, which in practice will usually be at least 1500 s.c.f. per barrel of olefinic feed. Larger excesses of hydrogen or inert gases may be employed to reduce olefin partial pressure and to increase the iso to normal (i/n) paraffin ratio of the converted product. Typical hydrogen to hydrocarbon ratios are 1,000 to 10,000 s.c.f. of hydrogen per barrel of olefin feed.

The reaction zone is operated under conditions promoting the isomerization-hydrogenation of olefin feed to the corresponding iso-paraffins. A superatmospheric pressure is employed, which pressure can range up to 3000 p.s.i.g. or more, but preferably is in the range of about 100 to 1500 p.s.i.g. An elevated temperature is employed in the catalyst bed, which temperature typically is in the range of about 400° F. to 750° F., and preferably is about 450° F. to 650° F. Catalyst activities, the nature of the material charged to the reaction zone, pressure and other operating variables will affect the selection of the operating temperature. Liquid hourly space velocities (LHSV) in the range of about 0.1 to 50 volumes of hydrocarbon (as liquid) per hour per volume per catalyst are employed, with a preferred LHSV being about 0.1 to 10.

The catalyst employed in the present process is a composite having a hydrogenation activity and an isomerization activity, and preferably, the catalyst activities are biased in favor of olefin isomerization. The catalyst composite comprises a metallic hydrogenation component and a solid acidic component. Preferably, an activity-control-affording agent is incorporated in the catalyst to provide the desired bias in activities which result in a paraffinic product containing more branched paraffins than the paraffin isomer equilibrium amount.

The hydrogenation component comprises one or more of the known hydrogenation catalysts. Hrydrogenation catalysts are well known and those found to be particularly useful are the metals, including the oxides and the sulfides, of Group VIII of the Periodic Table, especially nickel, platinum, palladium, and cobalt. The amount of the hydrogenation metal incorporated in the catalyst can vary over a wide range, with the amount being selected to provide the desired catalyst activity. For example, large amounts of nickel, e.g., up to about 30 weight percent can be employed, and as little as about 0.1 weight percent is also effective, with about 0.5 to 5 weight percent nickel being preferred. Typically, about 0.05 to 2 weight percent platinum is effective, and preferably about 0.1 to 1 weight percent platinum is generally preferred. In a preferred embodiment of the invention, such Group VIII hydrogenation catalysts are supported upon a solid acidic component, such as a silica-alumina cracking catalyst base. While an impregnated type catalyst is preferred, other catalyst forms may be employed, such as a catalyst wherein the various components are co-precipitated from a sol. Advantageously, the hydrogenation component is incorporated into the catalyst by impregnating the solid acidic support with various solutions of the hydrogenation metal group, such as palladium chloride, chloroplatinic acid, nickel acetate, cobalt acetate, nickel nitrate, etc., followed by drying and calcining at elevated temperatures. Typically, the composite is dried for a suitable time at a temperature between about 250° F. and 400° F., followed by calcining for a suitable time at a temperature between about 800° F. and 1200° F.

In general, the solid acidic component of the catalyst must provide sufficient acidity to promote the skeletal isomerization of straight chain olefins under the conditions of the process, and a high surface area material, typically having a surface area of about 100 to 500 square meters per gram, preferably is employed. On the other hand, the acidity should not be such as to promote the rapid isomerization of paraffins. The catalyst acidity relates to isomerization activity, and methods of measuring catalyst acidity are well known and need not be described herein. Various acidic catalyst materials are well known in the art, e.g., the acid treated clays and aluminas, and various mixtures of silica, alumina, magnesia, etc. Typically, the solid acidic component of the catalyst can be a naturally occurring mineral, such as montmorillonite clay, a synthetic silica-alumina, or a combination of these. Preferably, an artificial aluminosilicate, such as one of the commercially available silica-alumina cracking catalysts is utilized as a support. The alumina portion of the support may vary from about 5 to 40 weight percent. Both the commercially available "high alumina" silica-alumina catalyst containing about 20 to 30 weight percent $Al_2O_3$, and the "low alumina" material containing about 10 to 15 weight percent $Al_2O_3$ have been found effective for this purpose.

Various activity-control-affording agents have been found to be effective in providing the desired activity bias in the catalysts. Agents found to be useful for this purpose include sulfur, arsenic, antimony and bismuth. Also, small amounts of metals such as copper, lead, silver and mercury have been found to be effective in providing the desired activity bias. The above agents may combine with the other catalyst components in various forms to produce a catalyst having the desired properties. For example compounds, such as the sulfides or arsenides of the hydrogenation metal may be formed, or, the agents, such as lead, mercury, etc. may be alloyed with the hydrogenation metal. Generally speaking, about 0.1 to 5 atoms of the aforementioned activity-control-affording agents per atom of a Group VIII hydrogenation metal are suitable, and preferably, the atom ratio is between about 0.1 and 1.

Catalysts which have been found to be especially well suited for use in the present process are the arsenides and sulfides of the Group VIII metals, especially nickel, supported upon a silica-alumina cracking type catalyst.

Advantageously, the desired proportion of the activity-control-affording agent is incorporated in the catalyst during its manufacture. For example, a nickel on silica-alumina catalyst base can be impregnated with a solution of an organic or inorganic compound of the particular agent, the solvent evaporated and the compound reduced to leave a deposit on the base. Such solutions include the aryl or alkyl substituted organometallics, e.g., triphenyl arsine, or the acids, the nitrates, the halides, etc. of the above-mentioned elements. Such solutions as mentioned above also may be introduced into the reaction zone to contact the catalyst base in situ, as by additions to the feed charged to the reactor, and thereby incorporate the desired element into the catalyst.

To better illustrate the operation of the present invention, the following examples are given wherein a sulfided nickel on silica-alumina catalyst is employed. However, these examples are given for exemplary purposes only, and are not intended to limit the scope of the present invention.

EXAMPLES

In the first instance, a sulfided 5 percent nickel on silica-alumina catalyst was prepared by impregnating a silica-alumina cracking catalyst containing approximately 25 percent $Al_2O_3$ with an aqueous nickel acetate solution, drying overnight at 400° F., pelleting with 4 percent Sterotext (hydrogenated cocoanut oil) and calcining at 1000° F. for 6 hours. The resulting composite was sulfided by pre-treatment with 8 percent $H_2S$-hydrogen gas at 730° F. The finished catalyst was then placed in a laboratory reactor and contacted with penten-1 containing one volume percent $CS_2$, in the presence of hydrogen gas under isomerization-hydrogenation conditions which included a pressure of 1000 p.s.i.g., a liquid hourly space velocity (LHSV) of one volume of oil per hour per volume of catalyst. Three separate runs were made. In the first run, the reaction was carried out with no aromatic hydrocarbon present. In the second run, the reaction was carried out in the presence of 3 volume percent phenanthrene. In the third run, the reaction was carried out in the presence of 33 volume percent of an aromatics-rich light catalytic cycle oil (LCCO) which had been desulfurized (0.012 percent sulfur and 0.014 percent nitrogen) and which had the following ASTM distillation characteristics: 10% point, 450° F.; 30% point, 490° F.; 50% point, 530° F.; 70% point, 575° F.; 90% point, 630° F. and 95% point, 650° F. The aromatics in the LCCO were primarily bicyclic and tricyclic. Temperatures and the hydrogen to hydrocarbon ratio (moles $H_2$/HC) varied slightly from run to run, as shown below in Table I wherein the results are shown. The product from the runs was essentially saturated and in all instances had a greater than equilibrium iso to normal (i/n) paraffin ratio.

*Table I*

|  | Vol. percent aromatic | | |
| --- | --- | --- | --- |
|  | None | 3% phenanthrene | 33% LCCO |
| Temperature, °F.[1] | 500–685 | 500–680 | 500–670 |
| Moles $H^2$/HC | 10.3 | 7.0 | 7.0 |
| Product, wt. percent: |  |  |  |
| $C_4$ | 15.2 | 4.4 | 1.3 |
| $C_6$–$C_7$ | 22.2 | 8.1 | 4.2 |
| $iC_5$ | 57.0 | 80.5 | 83.2 |
| $nC_5$ | 5.5 | 7.0 | 11.5 |
| i/n Ratio, $C_5$ | 10.4 | 11.5 | 7.3 |

[1] Temperature range due to the exothermic nature of the reaction.

From Table I it is seen that the addition of polycyclic condensed ring aromatics to the feed markedly reduces the formation of side reaction products in the above isomerization-hydrogenation reaction.

Similar experimental runs were made employing the above-described sulfided nickel on silica-alumina catalyst, and a $C_6$ fraction of catalytically cracked debutanized naphtha (approximately 65 percent olefin) containing 0.6 volume percent $CS_2$. In the first run no aromatic was added to the feed, and in the second run, 32.5 volume percent of a catalytic hydroformer reformate bottoms fraction was added to the feed. This latter heavy aromatic material was comprised substantially of tricyclic condensed ring aromatics and boiled within the range of about 500° F. to 760° F. The catalyst was contacted with the above olefinic naphtha and aromatic in the presence of hydrogen gas at 1000 p.s.i.g., 0.67 volume of oil per hour per volume of catalyst, and a hydrogen to hydrocarbon mole ratio varying between 8 and 10 moles $H_2$/HC. The catalyst bed temperature increased from 500° F. to 620° F. during the run. The product was essentially saturated. The reduction in the formation of side reaction products lighter than the olefinic feed is shown in the following Table II.

*Table II*

|  | Vol. percent aromatic reformate | |
| --- | --- | --- |
|  | None | 32.5% |
| Light ends Production, wt. percent (olefin): |  |  |
| $C_1$ | 0.4 | 0.3 |
| $C_3$ | 1.5 | 0.9 |
| $C_4$ | 7.0 | 1.5 |
| $C_5$ | 3.5 | 0 |
| $C_6$ i/n ratio | 10.5 | 12.0 |

From Table II is seen that the formation of light ends, i.e., hydrocarbons having a lesser number of carbon atoms than the $C_6$ feed, is markedly reduced by the addition of the polycyclic aromatic to the feed.

From the foregoing description of the present invention, various alternative schemes and modifications in the method of operation will become apparent to the skilled artisan, and, as such, these fall within the spirit and scope of the present invention.

What is claimed is:

1. In a process for the production of branched-chain paraffinic hydrocarbons from less-branched unsaturated hydrocarbons by contacting a light olefinic hydrocarbon feed in a reaction zone with an active composite isomerization-hydrogenation catalyst in the presence of a hydrogen-affording gas under isomerization-hydrogenation conditions including an elevated pressure and temperature in the range of about 400° F. to 750° F., the method which comprises carrying out said contacting in the presence of a minor amount, based on olefin feed, of a polycyclic aromatic hydrocarbon effective to reduce the formation of side reaction products.

2. The process of claim 1 wherein said aromatic hydrocarbon is a condensed ring polycyclic aromatic introduced into the reaction zone in an amount between about 0.5 and 40 volume percent, based on olefin feed.

3. The process of claim 1 wherein said aromatic hydrocarbon is a catalytic cycle oil boiling in the range of about 350° F. to 850° F.

4. The process of claim 1 wherein said aromatic hydrocarbon is a catalytic reformate fraction boiling in the range of about 500° F. to 760° F.

5. The process of claim 1 wherein said catalyst is biased in favor of olefin isomerization and comprises a metallic hydrogenation component, a solid acidic component and an activity-control-affording agent, and wherein said isomerization-hydrogenation conditions include an elevated pressure and a temperature in the range of about 450° F. to 650° F.

6. A process for the production of branched-chain paraffinic hydrocarbons, which process comprises contacting a light olefinic hydrocarbon feed with an active composite isomerization-hydrogenation catalyst in a reaction zone in the presence of a hydrogen-affording gas under elevated pressure and at a temperature in the range of 400° F. to 750° F., said catalyst being biased in favor of olefin isomerization and comprising an active Group VIII metallic hydrogenation component supported on a solid acidic component and an activity-control-affording agent, and introducing into said reaction zone during said contacting about 0.5 to about 40 volume perment, based on olefin feed, of a polycyclic aromatic hydrocarbon effective to reduce the formation of side reaction products.

7. The process of clam 6 wherein said aromatic hydrocarbon contains from 2 to 5 aromatic rings per molecule, and is present in an amount between about 3 and 10 volume percent, based on olefin feed.

8. The process of claim 6 wherein said activity-control-affording agent is an element selected from the group consisting of sulfur, arsenic, antimony, bismuth, copper, lead, silver and mercury.

9. The process of claim 8 wherein said feed contains a substantial amount of $C_4$–$C_7$ normal olefins, and wherein said catalyst comprises sulfided nickel supported on silica-alumina and wherein said isomerization-hydrogenation conditions include a temperature in the range of about 450° F. to 650° F., a pressure in the range of about 100 to 1500 p.s.i.g., a space velocity in the range of about 0.1 to 10 volumes of hydrocarbon per hour per volume of catalyst and at least 1500 s.c.f. of hydrogen per barrel of olefin.

10. The process of claim 9 wherein said aromatic hydrocarbon is a catalytic cycle oil boiling in the range of about 350° F. to 850° F.

11. The process of claim 9 wherein said aromatic hydrocarbon is a catalytic reformate fraction boiling in the range of about 500° F. to 760° F.

(References on following page)

References Cited by the Examiner

UNITED STATES PATENTS

| | | |
|---|---|---|
| 2,404,436 | 7/1946 | Crawford et al. ____ 260—683.76 |
| 2,459,465 | 1/1949 | Smith _____ 208—57 |
| 2,762,854 | 9/1956 | McKinley et al. ____ 260—683.65 |
| 2,926,207 | 2/1960 | Folkins et al. _____ 260—683.65 |
| 3,116,232 | 12/1963 | Nager et al. ____ 260—683.65 X |
| 3,149,180 | 9/1964 | Platteeuw et al. ____ 260—683.65 |

DELBERT E. GANTZ, *Primary Examiner.*

ALPHONSO D. SULLIVAN, *Examiner.*